United States Patent

Ringholm

[15] 3,680,972

[45] Aug. 1, 1972

[54] ELECTRO HYDRAULIC CONTROL DEVICE FOR WATER TURBINES

[72] Inventor: Carl-Erik Ringholm, Trollhattan, Sweden

[73] Assignee: Aktienbolaget NOHAB, Trollhattan, Sweden

[22] Filed: Dec. 11, 1969

[21] Appl. No.: 884,239

[30] Foreign Application Priority Data

Dec. 17, 1968 Sweden...................17268/68

[52] U.S. Cl.....................................415/36, 415/17
[51] Int. Cl.........................................F01b 25/06
[58] Field of Search.............................415/36, 17

[56] References Cited

UNITED STATES PATENTS

| | | | |
|---|---|---|---|
| 2,863,283 | 12/1958 | Schmider et al. | 415/17 |
| 3,342,194 | 9/1967 | Dwight | 415/17 |
| 3,564,273 | 2/1971 | Cockrell | 415/17 |
| 1,123,927 | 1/1915 | Rotter | 415/36 |
| 1,150,682 | 8/1915 | Kieser | 415/36 |
| 1,990,872 | 2/1935 | Lacy | 415/36 |

FOREIGN PATENTS OR APPLICATIONS 1,119,788   12/1961   Germany....................415/36

*Primary Examiner*—C. J. Husar
*Attorney*—Hane, Baxley & Spiecens

[57] ABSTRACT

An electrohydraulic governor for water turbines with electric controller controls the main valve for the turbine's guide-vane ring servomotor via a control transmission and a control head by means of electric feedback from the said servomotor. The governor has a mechanical feedback arrangement which is connected when the electric controller is out of action.

9 Claims, 3 Drawing Figures

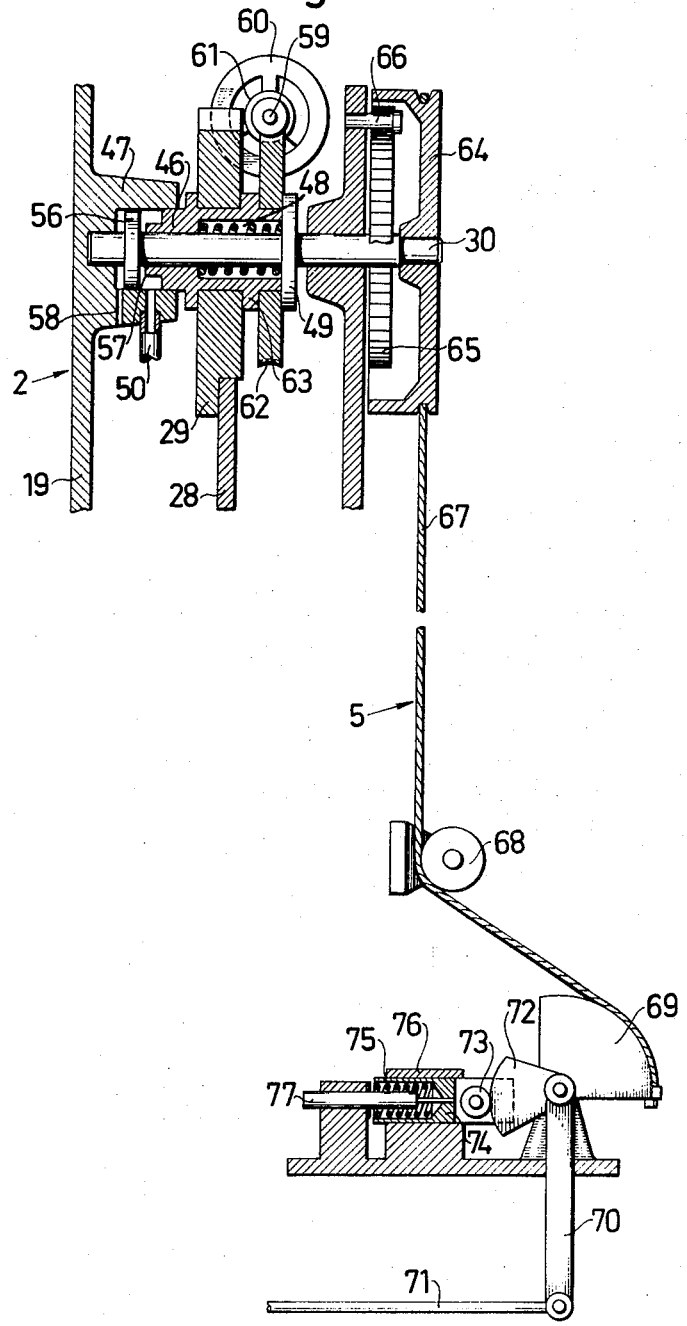

ELECTRO HYDRAULIC CONTROL DEVICE FOR WATER TURBINES

The present invention relates to an electrohydraulic governor for water-turbines with an electric controller for controlling the main valve for the turbine's guide-vane ring servomotor via a control transmission and control head by means of electric feedback from the said servomotor. In recent years electrohydraulic governors have been enjoying increasingly wide-spread adoption for the purpose of water-turbine control. They can be divided into several types all having the common feature that the feedback is taken electrically from the output movement of the main servomotor for guide-vane ring adjustment or from a servomotor operating the main servomotor control valve.

In cases where there is an electrical feedback to the governor directly from the main servomotor, control of the turbine will be lost if an interruption occurs in the electric circuit with consequent stoppage of the electric feedback signals. This implies that the turbine must be stopped immediately unless some other means can be devised for securing the necessary system feedback. The object of the present invention is to provide a protective arrangement which cuts in on the occurence of an interruption of the electric circuit and thereby assures the necessary system feedback while also permitting manual turbine control. This arrangement need not give such an accurate feedback signal as the electric feedback system since it is intended only for emergency use. This object is achieved by the governor according to the present invention, which governor is characterized by a mechanical feedback arrangement designed to be connected up when the electric controller is out of action.

The invention will now be described with reference to the accompanying drawings wherein:

FIG. 3 shows a device for mechanical feedback input to the governor, whereby the top part of the figure is turned through 90° with respect to the bottom part and shows a larger scale section along the line III — III of FIG. 2.

Figure 1:
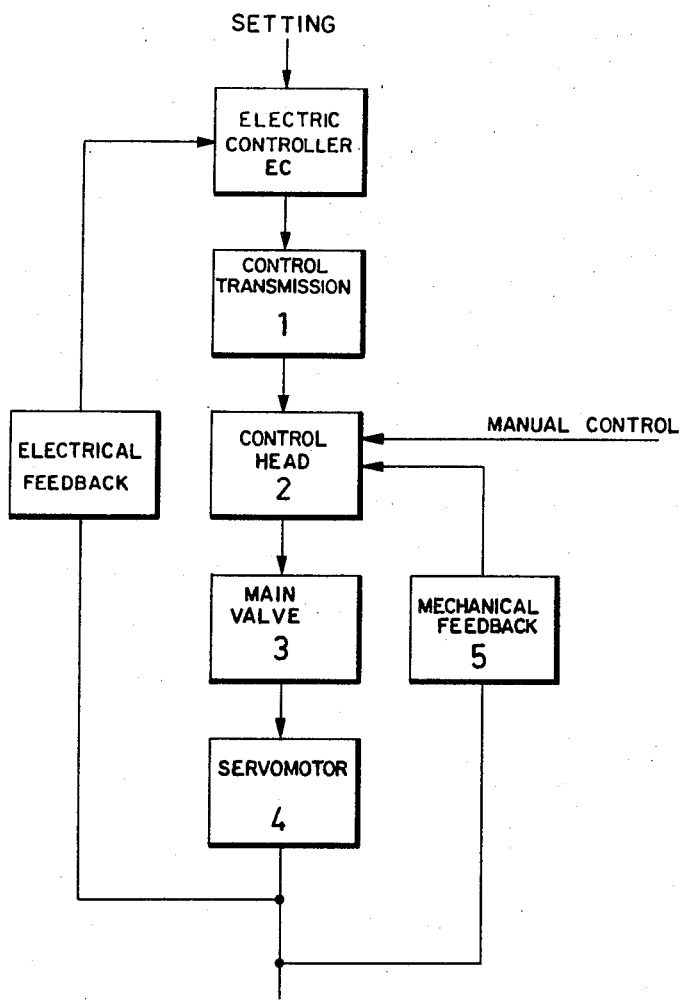
FIG. 1 is a block diagram of a governor according to the invention.

FIG. 1 shows schematically the general layout of an electrohydraulic governor according to the present invention. The required turbine input power is hooked up to an electric controller. The electric signals from the electric controller are converted to mechanical movement in a control transmission and power-amplified in a control head which in turn operates the main valve for the hydraulic guide-vane ring servomotor. The main valve allows hydraulic fluid to pass to the servomotor which is thereby caused to move for adjusting the guide-vane ring in the turbine, i.e. for altering the guide-vane aperture through which water is admitted to the rotor. The servomotor's output movement is fed back electrically to the electric controller in the form of a feedback voltage corresponding to the position of the servomotor. Should interruption of the electric circuit occur and the feedback signal cease, then according to the present invention a mechanical system cuts in which feeds back to the servomotor's output movement to the control head whereby manual control of the guide-vane aperture is also made possible.

Figure 2:
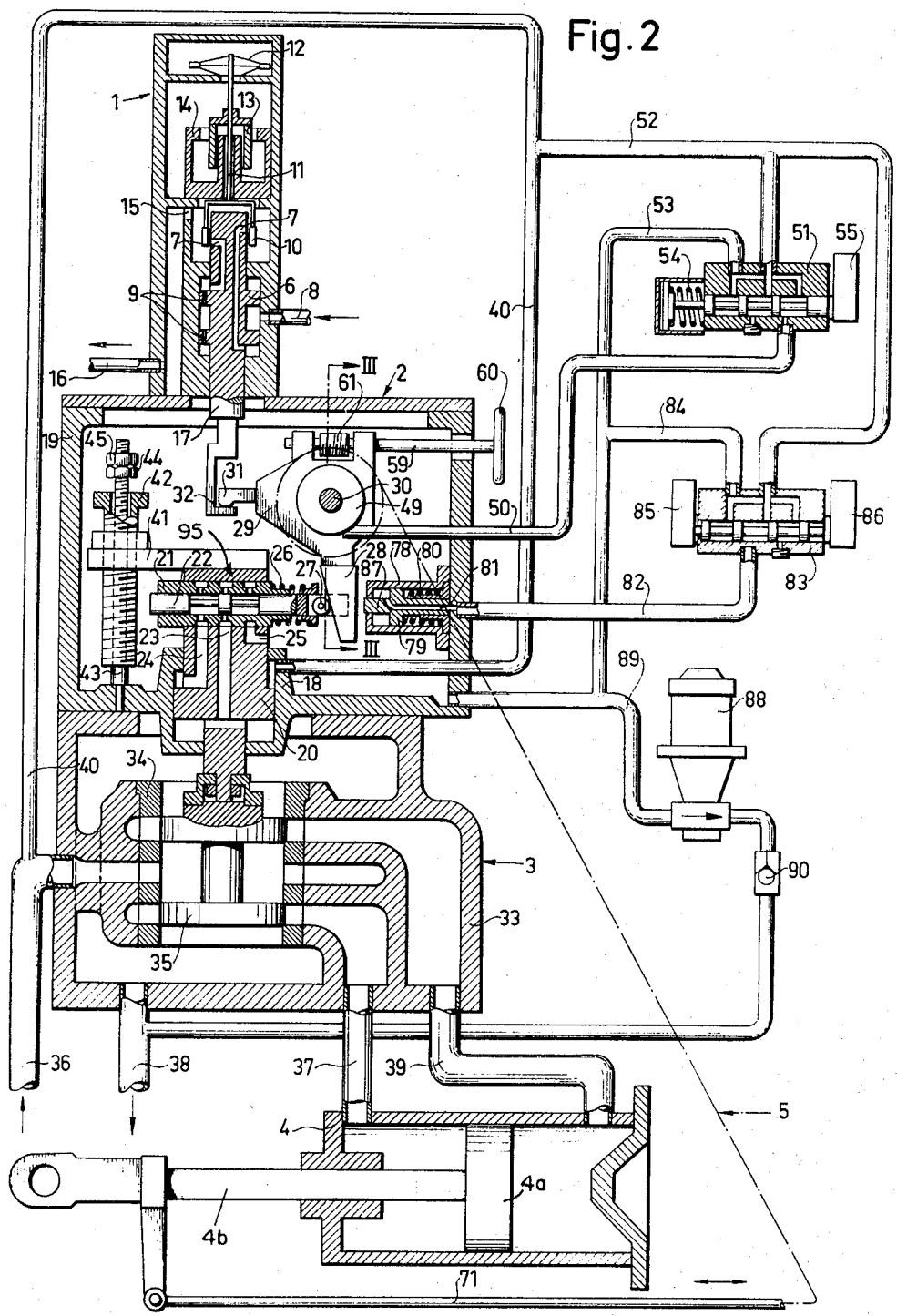
FIG. 2 is a sectional elevation of the hydraulic part of the governor.

FIGS. 2 and 3 show the details of the hydraulic and mechanical parts of the governor. Since the invention does not concern the electrical parts none of this equipment is shown. For ease of reference, all unit blocks in FIG. 1 having a correspondence with FIG. 2 are indicated by the same reference numbers in both of these figures.

The control transmission 1 converts the electric control quantities from the electric controller EC into axial movement. The transmission also produces a considerable power amplification. The control transmission, which is of a type already known to the art, includes a double piston 6 whose top piston-rod end is formed as a valve-slide with ports 7. The hydraulic oil is admitted through pipe 8 and first passes through a pair of fixed chokes 9 recessed into the double piston. The oil is then passed through internal ducts in the piston-rod to a pair of variable chokes that are formed when a control sleeve 10 partly covers the ports 7 in the top of the piston-rod. The oil pressure at either end-face of the piston 6 is determined by the ratio between the pressure drop in the fixed chokes and that in the variable chokes. The length of control sleeve 10 is so chosen in relation to the distance between the ports 7 that, when in the neutral position, approximately half the system pressure will be acting on the two end-faces of piston 6.

If the control sleeve 10 moves upwardly the upper port is choked more than the lower 9 whereby the pressure increases on the underside of the piston and decreases on its topside. The piston will therefore move upwards until equilibrium is regained. The reverse happens when the sleeve 10 moves downwardly so that in effect the piston follows up the movements of the sleeve. Control sleeve 10 is secured to a rod 11 which is adjustably suspended from a cruciform plate-spring 12. A coil 13 is carried on rod 11. This coil is located in the field of a powerful permanent magnet 14. Coil 13 has two winding halves which are transfluxed by opposing control currents from the electric controller. Depending on the relative strength of these two currents the coil and thus control sleeve 10 move upwards or downwards from the neutral position. Thus, the electrodynamic force of the coil together with the plate-spring constant will at all times govern the position of the sleeve and hence of the piston. The outgoing oil is discharged via a spillway 15 placed higher than the ports 7 and removed through pipe 16 to an oil-sump.

One piston-rod end 17 extends from the control transmission into the control head 2. This control head amplifies the movement of the control transmission by means of a control servomotor 18 for operating the main valve 3. Hereinto is also input the mechanical feedback 5, manual control and emergency stop operation. The control head is contained in a housing 19 which at the same time serves as a collector tank for the oil draining from piston 6. Control servomotor 18 includes a piston 20 and transversely through the neck of same are fitted, fixed and slidably respectively, the bush 21 and axial slide 22 of a control valve 95. Consequently, this valve follows the servomotor piston 20 in its movements up and down. Valve 95 serves to connect a duct 23, leading from the underside of the piston 20, either with a duct 24 leading from the topside of the piston or with a duct 25 to discharge. However, with the valve in the neutral position the said ducts are kept separated.

A compression spring 26 presses slide 22 to the right (see FIG. 2) so that a roller 27 mounted on said slide bears against a reset spur 28. Reset spur 28 forms one arm of a bell crank lever 29 freely journalled on a shaft 30 which is in turn pivoted in the housing 19. The other arm 31 of the bell crank lever sits in a bracket 32 which is secured to the piston-rod end 17. Spring 26 keeps arm 31 continuously bearing against bracket 32 so that the motion of the control transmission is always followed by the bell crank lever 29.

Main valve 3, which is operated by control servomotor 18, comprises a valve-body 33 with a bush 34 in which moves a valve-slide 35. When the slide is downwardly moved a pressure oil line 36 is connected via line 37 with one side of the piston-rod of guide-vane ring servomotor 4 while an outlet 38 is connected via a line 39 with the opposite side of the piston 4a, whereby the piston-rod 4b is displaced to the right in FIG. 2 and exerts a closing action on the guide-vanes (not shown). Conversely, an opening action is applied to on the guide-vanes when the valve-slide moves upwards. In the position represented by FIG. 2 the pressure oil line and the outlet are both shut off from the servomotor. From oil pressure line 36 a branch 40 is taken off for supplying oil inter alia to control servomotor 18 where it connects to the space above the topside of piston 20. The previously mentioned pressure oil for the control transmission can also be taken from this system.

A yoke 41 is secured on top of servomotor 20. Two externally threaded sleeves or hollow screws 42 are screwed through threaded holes in this yoke and through each said sleeve there passes a pin 43 secured at its bottom end to the housing 19 and having a threaded top end onto which are screwed an adjusting nut 44 and a lock-nut 45. By means of sleeves 42 and nuts 44 the stroke of the control servomotor piston 20 can be adjusted and therewith the closing and opening time of the guide-vane ring servomotor due to the resulting adjustment of the oil passage openings in the main valve 3.

The mechanical feedback 5 and the manual control are effected via shaft 30, wherefore this shaft will in future be referred to as the feedback shaft. By means of a clutch-in lock the bell crank lever 29 can be locked to the feedback shaft 30. To this end the bell crank lever 29 is seated on a coupling piston 46 (FIG. 3) which is slidable in a locking cylinder 47. Piston 46 is kept pressed into cylinder 47 by a spring 48 that bears against a collar 49 on the feedback shaft 30. A line 50 connects the locking cylinder 47 to a slide-valve 51 (FIG. 2) which serves to connect said line into either with pressure oil line 40 via a line 52 or with discharge via a line 53. Valve 51 is controlled by the action of a compression spring 54 and a magnet 55 operable by the electric controller's monitoring functions and switched in by the closed circuit current principle. This magnet will hereinafter be called the locking magnet. The movement of piston 46 by the action of spring 48 (to the left in FIG. 3) is limited by a collar 56, fitted on the feedback shaft 30 coacting with a shoulder 57 projecting from the said piston 46. Oil that leaks into the cylinder space on the opposite side of collar 56 is drained through a drain duct 58. It should be noted that in normal operation the locking cylinder 47 is connected to discharge whereby spring 48 holds the coupling piston 46 pressed over to the left (see FIG. 3).

In the bell crank lever 29 there is rotatably journalled a rod 59 fitted at one end with a handwheel 60 and at the other end with a worm 61 between its two bearing supports. This worm engages with a pinion 62 which is freely rotatably journalled on coupling piston 46 but can be clamped fast between a collar 63 on the coupling piston and collar 49 on the feedback shaft 30 when the piston is moved against the action of spring 48 towards collar 49. Rod 59 extrudes through a hole in the housing wall and handwheel 60 is outside the housing 19. The hole is just large enough to allow rod 59 to move with the bell crank lever 29.

On one end of the feedback shaft 30 projecting outside the housing is mounted a sheave 64 shaped as a housing for a spiral spring 65 that is restrained between a fixed anchorage on the housing 19 and the feedback shaft. Onto the sheave is secured the feedback line 67 (forming part of the mechanical feedback arrangement) which is kept taut by the spiral spring 65. The feedback line is led via a guide roller 68 and attached to a quadrant 69 rigidly fixed to a crank 70 whose free end is connected via a link 71 to the piston-rod 4b of the guide-vane ring servomotor 4. Likewise rigidly fixed to crank 70 is a cam 72 which coacts with a roller 73 carried on a slide 74 which is forced towards the cam by a compression spring 75 and slidingly housed in a guide 76. This guide imparts a linear motion to a position sensor 77 connected to the electric feedback circuit. The mechanical feedback arrangement 5 thus comprises the feedback shaft 30 (as a torque transmitter, not as a bearing member), sheave 64, line 67 and quadrant 69 while crank 70 and link 71 are part of the ordinary electrical feed-back system (being ancillary to position sensor 77).

Also in housing 19 is an emergency stop servomotor 78 with a piston 79 biased to the left (FIG. 2) by a compression spring 80. The cylinder space on the opposite side of spring 80 is connected via a duct 81 through the piston 79 and a line 82 to a slide-valve 83 which connects said line 82 either with the pressure oil line 52 or with discharge via a line 84. Valve 83 is controlled by the action of magnets 85 and 86. Piston 79 has an extension stub 87 extending through the cylinder head centrally abreast the reset spur 28.

For the purpose of evacuating the used oil from housing 19 a drain pump 88 is provided which pumps out the oil through a line 89 and NR valve 90 to the discharge line 38 extending from the main valve 3.

During normal operation the governor according to the present invention functions in the following manner. Suppose that the control transmission 1 has received a reduced signal from the electric controller. As a result of such signal, the control transmission piston 6 moves upwards thereby causing the bell crank lever 29 to turn clockwise. The the reset spur 28 now forces the control valve's slide 22 to the left and an outlet is opened for the oil from the underside of the piston 20 of the control servomotor 18 through ducts 23 and 25. Since there is full oil pressure on the topside of piston 20 the latter will move downwards as a result of which the slide 35 of main valve 3 is likewise moved downwards and the guide-vane ring motor 4 applies a closing action on the guide-vanes. Due to the taper of spur 28, slide 22 simultaneously moves back to the right to the closure position and the movement will cease. When the control transmission now changes its direction of movement bell crank lever 29 will turn anticlockwise whereby spring 26 forces the slide 22 of the control valve 95 to the right. Pressure oil then flows up through duct 24 and piston 20, through valve 95 and down through duct 23 to the underside of piston 20. Since the area of the bottom face of this piston is double that of the top the piston will now move upwards. Reset spur 28 then forces slide 22 back to the left and movement will cease when piston 20 has reached a position corresponding to the new position of the control transmission 1. Thus, control servomotor 18 accurately copies the movements of control transmission 1 but, since the taper of spur 28 is slight, piston 28 must move a very long way before control valve 95 is reset. Consequently, an amplification of the control transmission's operate movement is obtained. At the same time a power amplification is secured which allows piston 20 to operate the main valve slide 35 directly. It should be noted that during this normal, automatic operation bell crank lever 29 (together with wormwheel 62) turns freely about the feedback shaft 30.

The mechanical feedback functions in the following manner. In the event of a fault in the electric controller such as to trigger monitoring functions, e.g. due to power supply failure, the coil on locking magnet 55 will be deenergized and valve 51 be changed over by compression spring 54. When this occurs, pressure oil line 52 is connected with line 50 whereupon the pressure oil passes to locking cylinder 47 and forces coupling piston 46 against wormwheel 62 which locks against collar 49. By this means the clutch-in lock has securely locked bell crank lever 29 to the feedback shaft through wormwheel 62. Bell crank lever 29 is now coupled with sheave 64 which is restrained by spiral spring 65 so that line 67 is always kept taut between quadrant 69 and the aforesaid sheave 64. As a result, any movement of the guide-vane ring servomotor 4 will be fed back to control valve 95 via link 71, crank 70, the mechanical feedback arrangement 5, feedback shaft 30 and bell crank lever 29. To avoid that bracket 32 on the control transmission 1 bears on arm 31 and thus impedes movement of the bell crank lever 29, arrangements are made for the control transmission to receive an increase signal either electrically or, if no electric power is available, through the control transmission's hydraulic balancing, at the moment of voltage loss in magnet 55, which increase signal causes bracket 32 to be lowered.

The turbine manual control functions as follows. The clutch-in lock has locked wormwheel 62 fast to feedback shaft 30 in the manner hereinover described and since worm 61 is carried on the bell crank lever 29 the latter will be fixed in relation to the shaft according to the position of the worm on the wormwheel's circumference. When worm 61 is turned by means of handwheel 60, the bell crank lever 29 is turned in relation to wormwheel 62. The feedback from the guide-vane ring may be considered as being inoperative at the instant of incipience. Thus, turning of worm 61 means that bell crank lever 29 is turned, the slide 22 of control valve 95 is pushed out and the piston 20 of servomotor 18 is displaced. The slide 35 of the main valve 3 is pushed out whereby a movement of the guide-vane ring servomotor 4 is obtained. This movement is fed back by the feedback transmission 5 to feedback shaft 30 which now turns so that the aforesaid operational movements are neutralized.

In the event of an emergency stop the governor works as follows. When a turbine emergency stop is required, the magnets 85, 86 are caused to move the slide in valve 83 to the right so that line 82 is connected with the discharge line 84 and discharge is obtained from the emergency stop servomotor 78 whereby the spring 80 of this servomotor forces the piston 79 over to the left (in FIG. 2), drives stub 87 against the back of reset spur 28 and pushes the slide 22 of the control valve 95 to the left so that piston 20 of control servomotor 18 moves downwards, and with it slide 35 in the main valve whereupon the guide-vane ring servomotor 4 closes the guide-vane ring. For this reason the emergency stop servomotor 78 is kept connected to the pressure oil line during turbine operation.

What we claim is:

1. An electrohydraulic governor for a water turbine with electric controller for controlling the main valve for the guide-vane ring servomotor of the turbine via a control transmission and a control head by means of electric feedback from a servomotor, said governor comprising a mechanical feedback arrangement (5) arranged to be connected up when the electric controller is out of action, said mechanical feedback system including a mechanism for transmitting movement from a piston of the servomotor to the control head of the main valve.

2. A governor according to claim 1 wherein a feedback shaft (30) is fitted in the control head and carries a bell crank lever (29) one of whose arms (31) is subordinate to the action of the control transmission (1) controlled by the electric controller and whose other arm (28) actuates a control valve 95 and a control servomotor (18) for the main valve (3).

3. A governor according to claim 2, wherein the second arm of the bell crank lever (29) is formed as a reset lug (28) while an axial slide (22) in control valve 95 is spring-loaded to bear on one of the faces of this reset lug, and wherein the control valve 95 is fitted in the piston (20) of the control servomotor (18) transverse to the direction of movement of said piston and the face of said reset lug is inclined with respect to said direction of the piston movement.

4. A governor according to claim 2 wherein a clutch-in lock (46,47) locks in the event of operating failure in the electric controller the bell crank lever (29) to a feedback shaft (30) which is connected to the piston of the servomotor via the mechanical feedback arrangement (5).

5. A governor according to claim 4, wherein the mechanical feedback arrangement (5) comprises a sheave (64) fixed on the feedback shaft (30), a sheave quadrant (69) rigidly attached to a crank (70) pivoted on the same hinge-pin and connected via a link (71) to the piston of the servomotor (4), and a line (67) between the aforesaid sheave and quadrant.

6. A governor according to claim 4, wherein the clutch-in lock comprises a coupling piston (46) in a hydraulic cylinder (47) which communicates through a line (50) with a locking valve (51) which in the event of operating failure in the electric controller connects the cylinder (47) to a pressure oil line (52) whereby the coupling piston (46) is brought to a locking position.

7. A governor according to claim 6, wherein the locking valve (51) comprises an axial slide-valve whose slide is acted upon in one direction by a magnet (55), switched on in the electric controller, an in the other direction by a spring (54) whereby the effect of the spring is less than that of the magnet when the latter is energized.

8. A governor according to claim 6 wherein a worm gear (62) and a worm (61) coacting therewith is rotatably mounted on the bell crank lever (29), the said worm gear (62) being rotatable about the feedback shaft (30) and journalled between a collar (49) on the shaft and a collar (63) on the coupling piston (46) so that the worm gear is clamped fast between said collars when the clutch-in lock is operated.

9. A governor according to claim 8, wherein the worm (61) is connected to a handwheel (60) for manual control of the turbine.

* * * * *